(12) United States Patent
Oh et al.

(10) Patent No.: US 10,785,284 B2
(45) Date of Patent: Sep. 22, 2020

(54) P2P TRANSFER METHOD AND PROGRAM HAVING ENHANCED SECURITY

(71) Applicant: ESTMOB INC., Seoul (KR)

(72) Inventors: Yoonsik Oh, Seoul (KR); Haeil Park, Seoul (KR)

(73) Assignee: ESTMOB INC., Seoul (KR)

( * ) Notice: Subject to any disclaimer, the term of this patent is extended or adjusted under 35 U.S.C. 154(b) by 108 days.

(21) Appl. No.: 15/927,738

(22) Filed: Mar. 21, 2018

(65) Prior Publication Data

US 2018/0213026 A1 Jul. 26, 2018

Related U.S. Application Data

(63) Continuation of application No. PCT/KR2015/010103, filed on Sep. 24, 2015.

(51) Int. Cl.
| | |
|---|---|
| *G06F 15/16* | (2006.01) |
| *H04L 29/08* | (2006.01) |
| *H04L 9/32* | (2006.01) |
| *H04L 9/08* | (2006.01) |
| *H04L 29/06* | (2006.01) |

(52) U.S. Cl.
CPC ............ *H04L 67/06* (2013.01); *H04L 9/0861* (2013.01); *H04L 9/0894* (2013.01); *H04L 9/3226* (2013.01); *H04L 63/061* (2013.01); *H04L 63/068* (2013.01); *H04L 67/327* (2013.01); *H04L 67/104* (2013.01)

(58) Field of Classification Search
CPC ..... H04L 67/06; H04L 9/0861; H04L 9/0894; H04L 63/061; H04L 63/068; H04L 63/0428

USPC .................. 709/219, 217, 229, 238
See application file for complete search history.

(56) References Cited

U.S. PATENT DOCUMENTS

2005/0267975 A1* 12/2005 Qureshi .................. H04L 51/04
 709/229
2006/0282674 A1* 12/2006 Saito ...................... G06T 1/0071
 713/176

(Continued)

FOREIGN PATENT DOCUMENTS

| KR | 10-2015-0056076 A | 5/2015 | |
|---|---|---|---|
| KR | 10-2005-0123503 A | 12/2015 | |
| WO | WO-2015072788 A1 * | 5/2015 | ............ H04W 12/04 |

OTHER PUBLICATIONS

International Search Report; issued in PCT/KR2015/010103; dated Jul. 29, 2016.

*Primary Examiner* — Kaylee J Huang
(74) *Attorney, Agent, or Firm* — Studebaker & Brackett PC

(57) ABSTRACT

A P2P transmission method having enhanced security, according to an embodiment of the present invention, comprises: a step for receiving by a server from a first client a first temporary key issuance request; a step for generating a comparison key; a step for receiving an input key from a second client; a step for receiving from a transmission client a transmission request for a particular file; a step for comparing the comparison key and the input key; a transmission path selecting step for selecting a particular transmission path between the transmission client and a reception client if the comparison key and the input key correspond to each other; and a file transmission requesting step for requesting file transmission, through the selected transmission path, from the transmission client and reception client.

9 Claims, 2 Drawing Sheets

(56) References Cited

U.S. PATENT DOCUMENTS

2009/0190586 A1\* 7/2009 Kim .................. H04L 12/18
  370/390
2015/0199541 A1\* 7/2015 Koch .................. G06F 21/31
  726/29

\* cited by examiner

P2P TRANSFER METHOD AND PROGRAM HAVING ENHANCED SECURITY

CROSS-REFERENCE TO RELATED APPLICATIONS

The present application is a continuation of International Patent Application No. PCT/KR2015/010103, filed on Sep. 24, 2015. The disclosure of the above-listed application is hereby incorporated by reference herein in its entirety.

BACKGROUND

The inventive concept relates to peer-to-peer (P2P) transfer method and program having enhanced security, and more particularly, relates to a method and a method that allow a file transfer to be performed under the condition that a key corresponding to the same character string is input to a transmission client and a reception client.

A cloud manner in which a transmission terminal uploads a file to a server and a reception terminal downloads the file from the server may be used to transfer data between terminals. According to the cloud manner, upload and download speeds may vary with locations for network conditions of the transmission terminal and the reception terminal, the security may be vulnerable, and a lot of costs may be necessary for server and line construction.

A peer-to-pear (P2P) transfer technology is being required to solve the issues. According to the P2P transfer technology, since data are directly exchanged between terminals, there is no need to upload or download files to or from a server. Also, in the case where the P2P transfer technology is used, since a file is not stored in the server, it is free from file leakage through server hacking.

SUMMARY

However, even in the case of the P2P file transfer manner, a file that is being transferred may be stolen by another client on its way. To prevent the issue, there is a need for a method that accurately checks and connects a transmission client and a reception client targeted for a file transfer.

Accordingly, the inventive concept is directed to provide security-enhanced P2P transfer method and program, which allow a server to connect a transmission client and a reception client through a relay node so as to perform a P2P file transfer, when a compare key issued according to a request of the transmission client or the reception client is matched with an input key input at a client of the third party.

According to an aspect of an embodiment, a security-enhanced peer-to-peer (P2P) transfer method includes receiving, at a server, an issue request for a first temporary key from a reception client, generating a compare key, the compare key being a first temporary key issued according to a request of the reception client, receiving an input key and a transfer request for a specific file from a transmission client, the input key including a second temporary key that the transmission client obtains, comparing the compare key and the input key, selecting a specific transfer path between the transmission client and the reception client when the compare key and the input key coincide with each other, and requesting a file transfer through the selected transfer path from the transmission client and the reception client.

In the generating, a time limit may be set to allow the first temporary key to be valid during a specific time.

In the generating, generation of a second character string that is similar to the first character string by a specific ratio or higher may be limited within the time lime upon generating a specific first character string as the first temporary key.

The selecting may include calculating an optimum transfer path through a specific relay node in consideration of locations of the transmission client, the reception client, and the relay node or in consideration of a transfer speed through the relay node.

According to another aspect of an embodiment, a security-enhanced P2P transfer method includes receiving, at a server, a transfer request for a specific file and an issue request for a first temporary key from a transmission client, generating a compare key, the compare key including the first temporary key issued according to a request of the transmission client and a first security key received from the transmission client, receiving an input key from a reception client, the input key including a second security key received from the reception client and a second temporary key that the reception client obtains, comparing the compare key and the input key, selecting a specific transfer path between the transmission client and the reception client when the compare key and the input key coincide with each other, and requesting a file transfer through the selected transfer path from the transmission client and the reception client.

According to another aspect of an embodiment, a security-enhanced P2P transfer method includes receiving, at a server, an issue request for a first temporary key from a reception client, generating, at the server, a compare key, the compare key including the first temporary key issued according to a request of the reception client and a first security key received from the reception client, receiving a transfer request for a specific file and an input key from a transmission client, the input key including a second security key received from the transmission client and a second temporary key that the transmission client obtains, comparing the compare key and the input key, selecting a specific transfer path between the transmission client and the reception client when the compare key and the input key coincide with each other, and requesting a file transfer through the selected transfer path from the transmission client and the reception client.

The security-enhanced P2P transfer method may further include receiving, at the server, an issue request for a security key from a specific first client to transmit a new security key to the first client. The server or the first client may transmit the new security key to a second client, and the first client and the second client may store the new security key therein and may apply the new security key to the first security key or the second security key. The first client may be the transmission client or the reception client, and the second client may include one or more clients except for the first client.

The second client may store the new security key for each user of the first client.

The security-enhanced P2P transfer method may further include receiving, at the server, an issue request for a security key from a specific first client to transmit a new security key to the first client. The new security key may be stored in the server after being matched with a user account of the first client. When the user account is input to a second client to log in, the server may transmit the new security key to the second client. The first client and the second client may store the new security key therein and may apply the new security key to the first security key or the second security key. The first client may be the transmission client or the reception client, and the second client may include one or more clients except for the first client.

According to another aspect of an embodiment, a security-enhanced P2P transfer program that is stored in a medium to execute the above-described method in combination with a computer that is a piece of hardware.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
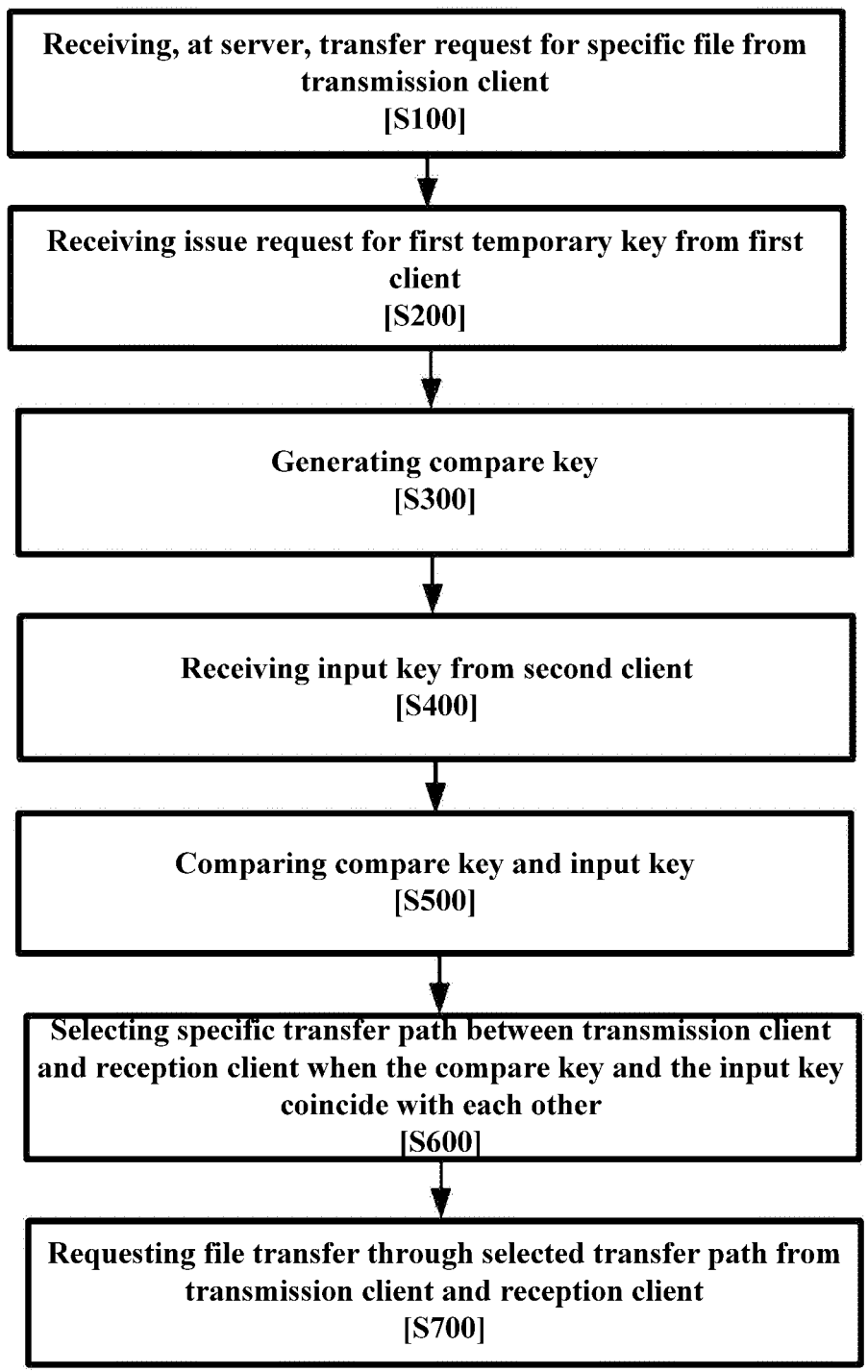
FIG. 1 is a flowchart illustrating a security-enhanced P2P transfer method according to an embodiment of the inventive concept.
Figure 2:
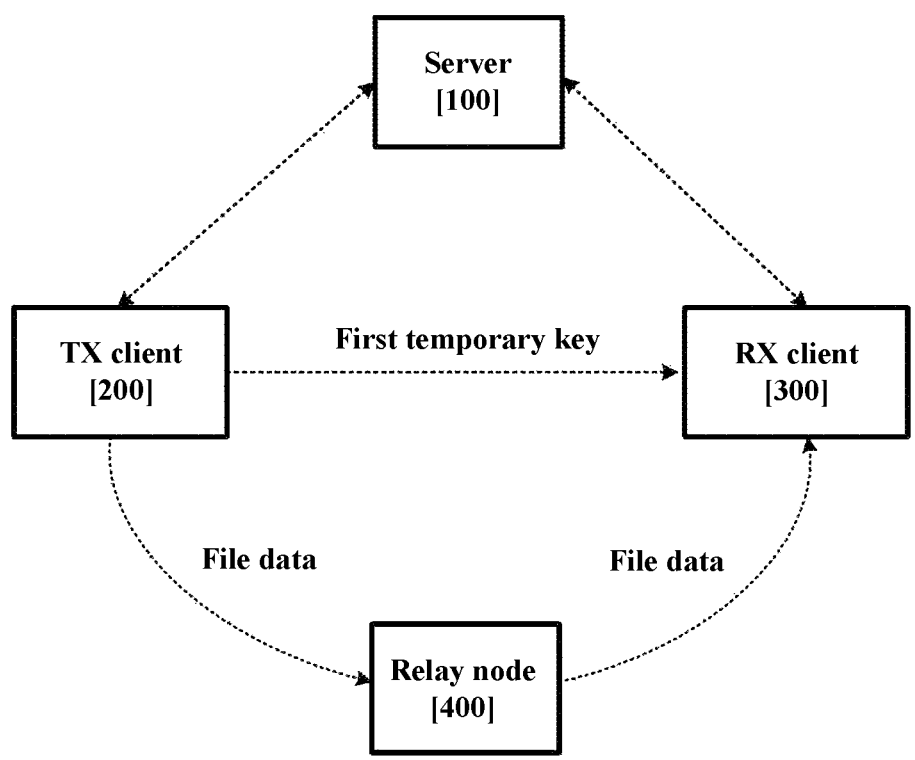
FIG. 2 is a view illustrating a connection relationship of a security-enhanced P2P transfer system according to an embodiment of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals denote the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Below, security-enhanced P2P transfer method and program according to embodiments of the inventive concept will be described with reference to accompanying drawings.

FIG. 1 is a flowchart illustrating a security-enhanced P2P transfer method according to an embodiment of the inventive concept.

Referring to FIG. 1, a security-enhanced P2P transfer method according to an embodiment of the inventive concept includes receiving, at a server 100, a transfer request for a specific file from a transmission client 200 (S100); receiving an issue request for a first temporary key from a first client (S200); generating a compare key (S300); receiving an input key from a second client (S400); comparing the compare key and the input key (S500); selecting a specific transfer path between the transmission client 200 and a reception client 300 when the compare key and the input key coincide with each other (S600); and requesting a file transfer through the selected transfer path from the transmission client 200 and the reception client 300 (S700).

The server 100 receives a transfer request for a specific file from the transmission client 200 (S100). For example, the transmission client 200 may request the server 100 to transfer a specific file selected by a user to the reception client 300. A file transfer request from the transmission client 200 may be received in various orders.

The server 100 receives the issue request for the first temporary key from the first client (S200). The first client may be any one of the transmission client 200 or the reception client 300. A first temporary key may correspond to a character string through which the transmission client 200 or the reception client 300 are recognized as a justified client, which requests file transmission and reception, if the first temporary key is identically received from the transmission client 200 and the reception client 300.

As an embodiment, the first client may be the transmission client 200, and the server 100 may receive the issue request for the first temporary key together with a file transfer request of the transmission client 200. For example, the server 100 may determine the file transfer request received from the transmission client 200 as the issue request for the first temporary key.

As another embodiment, the first client may be the reception client 300. In this case, after the reception client 300 transmits the issue request for the first temporary key to the server 100, the transmission client 200 may request a file transfer. That is, the transmission client 200 may request a file transfer while transmitting an input key to be described later to the server 100.

The server 100 generates the compare key (S300). The compare key may mean a character string that the server 100 generates for the purpose of improving security of a file transfer, and a first temporary key may be included in the character string.

As an embodiment, the compare key may be the first temporary key issued according to a request of the first client. Also, the server 100 may set the first temporary key itself to the compare key and may compare the first temporary key with an input key (i.e., a second temporary key) input from the second client later.

In particular, in the case where the first client is the reception client 300, the server 100 may utilize the first temporary key itself as the compare key. In the case where the transmission client 200 requests a transfer of a specific file from the server 100 while requesting an issue of the first temporary key and a user (i.e., a transmission user) of the transmission client 200 transfers the first temporary key to a user (i.e., a reception user) by using a specific path (e.g., a text message, a social networking service (SNS), or voice), if the first temporary key is stolen by another person in the process of transferring the first temporary key, a file may be leaked without hacking the server 100 or the transmission client 200. In contrast, in the case where an issue of the first temporary key is requested by the reception client 300 and the first temporary key is used as the compare key, since the user of the transmission client 200 requests a transfer of a specific file while inputting the first temporary key issued by the request of the reception client 300, connection of the transmission client 200 and a client of a third party is formed only by leakage of a character string corresponding to the first temporary key, and thus, a file transfer may be prevented from being performed.

As another embodiment, the compare key may include the first temporary key issued according to a request of the first client and a first security key received from the first client. The first security key may correspond to unique identification data associated with a specific user or with a relationship between specific users.

For example, the first security key may issue a specific character string when a specific first user subscribes to a service. The first user may in advance provide his/her own first security key to other user(s) that frequently performs a file transfer with the first user. Other users may store the first security key in a client through encryption. The first user may provide the first security key to other users in various manners. The client of the first user may transmit the first security key to a client of other user through the following manner: Bluetooth low energy (BLE) or near field communication (NFC). In particular, in the case of using the NFC manner, since data are transmitted while a client and a terminal contact each other, the probability that the data are stolen during communication is low.

Also, for example, in the case where the first security key corresponds to unique identification data associated with a relationship between users, the first user and the second user requests the server 100 to form a file exchange relationship, and the server 100 may generate and transmit the first security key to the client of the first user and the client of the second user. The client of the first user and the client of the second user may encrypt and store the first security key received.

In the case where the first client is the transmission client 200, the transmission client 200 may transmit the first security key to the server 100 in the process of requesting a file transfer from the server 100, and the server 100 may generate the compare key by combining the received first security key and the first temporary key generated according to an issue request. Alternatively, the server 100 may receive identification information (e.g., an ID of a user) of a user, may search for the first security key coinciding with the identification information from the server 100, and may generate the compare key by combining the first security key and the first temporary key.

In the case where the first client is the reception client 300, the reception client 300 may transmit the first security key coinciding with the user of the reception client 300 to the server 100 while requesting the server 100 to issue the first temporary key. Alternatively, the server 100 may receive identification information (e.g., an ID of a user) of a user, may search for the first security key coinciding with the identification information from the server 100, and may generate the compare key by combining the first security key and the first temporary key.

The first client may encrypt and transmit the first security key based on a specific encryption rule upon transmitting the first security key to the server 100, and the server 100 may receive and decrypt the transmitted key.

To generate the compare key through combination with the first security key, the server 100 needs to issue a new security key, and the first client may utilize the issued new security key as the first security key. To this end, an embodiment of the inventive concept may further include receiving an issue request for a security key from a specific first client to transmit the new security key to the first client.

The new security key may be transmitted to the second client by the server 100 or the first client, and the first client and the second client may store the new security key therein. That is, the new security key may be stored in the first client or the second client so as to be used as the first security key or the second security key. Also, in the case where a security key is a character string assigned to each user, each client may store the new security key for each user. That is, a client may match a user with a security key and may store a result of the matching in a memory.

Also, the first client and the second client may correspond to clients of the same user, the user may want to transmit a specific file in his/her own first client to the second client. In this case, the new security key issued may be stored in the server 100 after being matched with a user account of the first client. That is, in the case where the user account is input to the second client to log in, the server 100 may transmit a new security key corresponding to the user account to the second client to allow the second client to store the new security key. As such, it may be no need to input a security key for a file transfer between a plurality of clients that a specific user possesses, and it may be possible to prevent a file from being leaked to another person during a file transfer between clients of the user.

Also, in the generating of the compare key (S300), a time limit may be set such that the first temporary key is valid during a specific time. As a long time elapses after the compare key is generated, the first temporary key may be leaked to another person, and thus, the probability that another person first inputs the first temporary key to establish connection for a file transfer is high. For this reason the server 100 may set a time limit where the first temporary key is valid, and may delete a connection relationship of the first temporary key and the file transfer request after the time limit. Also, the server 100 may make the first temporary key valid within a specific time limit, and thus, a plurality of P2P file transfers may be performed by using the specific number of character strings.

Also, in the generating of the compare key (S300), in the case where a specific first character string is generated as the first temporary key, generation of a second character string that is similar to the first character string by a specific ratio or higher may be limited. A user that inputs the first temporary key may input a similar character string (i.e., the second character string) by mistake. For example, the user may input one digit incorrectly, or may input two digits, with positions of the two digits being reversed. If similar character strings exist at the same time, as the second character string similar to the first character string, which the user of the second client intends, is mistyped, a connection relationship with a client different from the first client may be established. This may mean that a different file is received. Accordingly, if the first character string is generated at a specific time point, while the first temporary key corresponding to the first character string is valid, the server 100 may limit second character strings similar to the first character string such that the second character strings are not issued as a temporary key.

The server 100 receives an input key from the second client (S400). The second client is a client, which does not correspond to the first client, from among the transmission client 200 and the reception client 300.

As an embodiment, the input key may correspond to a second temporary key that the second client obtains. That is, the second client may transmit a second temporary key, which is obtained through various paths from the user of the first client, as an input key to the server 100. For example, the second temporary key may be composed of a portion of an SNS message from the user of the first client and a portion of a text message from the user of the first client. In the case where a temporary key received with a text message, an SNS message, etc. exists, the second client may automatically recognize and obtain a character string included in the text message or the SNS message as the second temporary key. Also, the second client may be directly provided with a character string from the user through a touchscreen or the like.

As another embodiment, the input key may include a second security key received from the second client and the second temporary key that the second client obtains. The second temporary key included in the input key may be obtained in the same manner as the input key is composed of only the second temporary key and may be transmitted to the server 100.

The server 100 may receive the second security key from the second client in various manners. For example, in the case of the P2P file transfer, since users that send and receive files perceive each other, the user of the second client may select the user of the first client as the other party, thus inputting or transmitting a security key (e.g., a security key being identification information of the other party or a security key indicating a connection relationship between users) to the server 100 together with a temporary key.

The format of the input key may be determined to correspond to the format of the compare key. That is, in the case where the compare key is composed of only the first temporary key, the input key may also be composed of only the second temporary key. Also, in the case where the compare key is formed of a combination of the first temporary key and the first security key, the input key may also be formed of a combination of the second temporary key and the second security key.

Afterwards, the server 100 may compare the compare key and the input key (S500). If the compare key is matched with the input key, the server 100 may select a specific transfer path between the transmission client 200 and the reception client 300 (S600). That is, the server 100 may select the most appropriate transfer path (e.g., a transfer path providing the highest speed, a transfer path where costs are not incurred, or a path that a user sets to the priority) of various relay nodes 400.

As an embodiment, the server 100 may calculate an optimum transfer path through the specific relay node 400 in consideration of locations of the transmission client 200, the reception client 300, and the relay node 400 or a transfer speed through the relay node 400. That is, the server 100 may select a plurality of candidate relay nodes 400 in consideration of locations of the transmission client 200, the reception client 300, and the relay node 400 and may select the relay node 400, which has the highest transfer speed, from among the plurality of candidate relay nodes 400.

Alternatively, the server 100 may set a distance from the transmission client 200, the relay node 400, and the reception client 300 to a first variable "D" and may set a transfer speed of the relay node 400 to a second variable "V". Under this condition, the server 100 may apply weights to the first and second variables "D" and "V" to select the relay node 400. To this end, the server 100 may in advance store one or more of identification information, location information, or transfer speed information for each relay node 400.

The transfer speed information for each relay node 400 may be statistical data extracted by using information in advance collected from the relay node 400. Here, the information in advance collected from the relay node 400 may include at least one of load information of each relay node 400 during a predetermined time, whether another server connecting to each relay node during a predetermined time exists, and a kind of an Internet service provider (ISP) supporting each relay node 400. The relay node 400 may be estimated as having a fast transfer speed as the load of the relay node 400 becomes smaller, as the number of other servers being connected to the relay node server 100 becomes smaller, and as a speed of the ISP supporting the relay node 400 becomes higher.

As another embodiment, since the relay node 400 may be a wireless access point to which both clients in the same region may connect, in the case where the transmission client 200 and the reception client 300 are placed with a space where the transmission client 200 and the reception client 300 may connect to the same wireless access point, the server 100 may use the wireless access point, to which the transmission client 200 and the reception client 300 connect, as the relay node 400.

The server 100 requests a file transfer through the selected transfer path from the transmission client 200 and the reception client 300 (S700). For example, the server 100 may send a request including identification information of the selected relay node 400 to the transmission client 200 to allow the transmission client 200 to send a file to the reception client 300 through the selected relay node 400.

The security-enhanced P2P transfer method according to an embodiment of the inventive concept may be implemented by a program (or an application) and may be stored in a medium such that the program is executed in combination with a computer being hardware.

For the computer to read the program and to execute the method implemented by the program, the program may include a code that is coded in a computer language, which a processor (e.g., a central processing unit CPU) of the computer may read through a device interface of the computer, such as C, C++, JAVA, or a machine language. The code may include a functional code related to a function that defines necessary functions that execute the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Further, when the processor of the computer is required to perform communication with another computer or server in a remote site to allow the processor of the computer to execute the functions, the code may further include a communication related code on how the processor of the computer executes communication with another computer or server or which information or medium should be transmitted and received during communication by using a communication module of the computer.

The inventive concept has the following effects.

First, it may be possible to prevent a file from being transferred to a different client that is not a reception client targeted for a file transfer of a transmission client. That is, file leakage may be prevented.

Second, as a temporary key and a security key are combined to a compare key, even though the temporary key is leaked, a file may be prevented from being leaked during a P2P transfer because the security key assigned to each user is not known.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A security-enhanced peer-to-peer (P2P) transfer method comprising:
   receiving, by a server, from a reception client, an issue request for a first temporary key;
   issuing, by the server, the first temporary key including a first character string, according to the issue request from the reception client;
   setting, by the server, the first temporary key as a compare key, which is configured to be valid only during a specific time set by the server,
   wherein the server is, during the specific time, restricted from issuing another first temporary key including a second character string that is similar to the first character string by a preset ratio or a higher ratio than the preset ratio;
   receiving, by the server, from a transmission client, an input key, which includes a second temporary key, and a transfer request for a specific file;
   comparing, by the server, the compare key and the input key;
   selecting, by the server, a specific transfer path between the transmission client and the reception client when the compare key and the input key coincide with each other; and
   requesting, by the server, to the transmission client, a file transfer of the specific file through the selected transfer path from the transmission client and the reception client.

2. The security-enhanced P2P transfer method of claim 1, wherein the selecting includes:
   calculating an optimum transfer path through a specific relay node in consideration of locations of the transmission client, the reception client, and the relay node or in consideration of a transfer speed through the relay node.

3. A non-transitory computer-readable recording medium storing a security-enhanced P2P transfer program to execute the method of claim 1 in combination with a computer hardware.

4. A security-enhanced peer-to-peer (P2P) transfer method comprising:
   receiving, by a server, from a reception client, an issue request for a first temporary key;
   issuing, by the server, the first temporary key including a first character string, according to the issue request from the reception client;
   setting, by the server, a compare key including the first temporary key and a first security key received from the reception client,
   wherein the compare key is configured to be valid only during a specific time set by the server, and
   wherein the server is, during the specific time, restricted from issuing another first temporary key including a second character string that is similar to the first character string by a preset ratio or a higher ratio than the preset ratio;
   receiving, by the server, from a transmission client, a transfer request for a specific file and an input key, which includes a second security key and a second temporary key;
   comparing, by the server, the compare key and the input key;
   selecting, by the server, a specific transfer path between the transmission client and the reception client when the compare key and the input key coincide with each other; and
   requesting, by the server, to the transmission client, a file transfer of the specific file through the selected transfer path from the transmission client and the reception client.

5. The security-enhanced P2P transfer method of claim 4, further comprising:
   receiving, by the server, from a first client, an issue request for a new security key, and transmitting, by the server, to the first client, the new security key,
   wherein the server or the first client transmits the new security key to a second client,
   wherein the first client and the second client store the new security key therein and apply the new security key to the first security key or the second security key,
   wherein the first client is the transmission client or the reception client, and
   wherein the second client includes one or more clients except for the first client.

6. The security-enhanced P2P transfer method of claim 5, wherein the second client stores the new security key for each user of the first client.

7. The security-enhanced P2P transfer method of claim 4, further comprising:
   receiving, by the server, from a first client, an issue request for a new security key, and transmitting, by the server, to the first client, the new security key;
   matching, by the server, the new security key with a user account of the first client, and storing the new security key in the server;
   transmitting, by the server, the new security key to a second client in which a user account that is the same as the user account of the first client is logged in,
   wherein the first client and the second client store the new security key therein and apply the new security key to the first security key or the second security key,
   wherein the first client is the transmission client or the reception client, and
   wherein the second client includes one or more clients except for the first client.

8. The security-enhanced P2P transfer method of claim 4, wherein the selecting includes:
   calculating an optimum transfer path through a specific relay node in consideration of locations of the transmission client, the reception client, and the relay node or in consideration of a transfer speed through the relay node.

9. A non-transitory computer-readable recording medium storing a security-enhanced P2P transfer program to execute the method of claim 4 in combination with a computer hardware.

* * * * *